3,357,918
FLUIDIZED LECITHIN COMPOSITION AND METHOD
Paul F. Davis, Addison, Ill., assignor to Central Soya Company, Inc., Fort Wayne, Ind., a corporation of Indiana
No Drawing. Filed May 27, 1964, Ser. No. 370,718
6 Claims. (Cl. 252—1)

This invention relates to a phosphatide composition which is pourable at room temperature. The invention also relates to a process of producing such a composition without the addition of fatty acids. Such acid addition results in (1) a substantial increase in acid value; and (2) a lowering of the phosphatide content of the finished product.

For example, commercial soy lecithin is normally plastic at levels as low as 65% phosphatides, as measured by the acetone insoluble content of the material. The balance is usually soybean oil: 33–35%, including as other minor constituents: pigments, free sugars, mineral matter, sterols, etc., and free soy fatty acids—all being natural constituents of commercial lecithin. This is due to binding with phosphatides and to incomplete separation of phosphatides from the other natural ingredients of the crude soybean oil during the so-called "degumming process."

In a typical commercial process, lecithin is obtained by adding water or steam to crude soybean oil. This results in the hydration of the lecithin, precipitating the lecithin in the form of a sludge. This sludge is generally separated by centrifugation, after which it is dried under reduced pressure to obtain the mixture which is commercial lecithin. Lecithin in this form contains as much as 35% soybean oil together with phosphatidyl ethanolamine, phosphatidyl choline, phosphatidyl inositides, phosphatidyl serine, carbohydrates, sterols, pigments, etc. In some instances the soybean oil may be removed by acetone extraction and then replaced by some other suitable diluents. In either event, the product has the consistency of wax and is very inconvenient to use. More efficient degumming can result in products having as high as 73–74% phosphatides, in which case, naturally, the plasticity problem is even more accentuated.

In commercial applications, a fluid lecithin product is very desirable from the point of view of easy handling and dispersing. For this reason, there is a considerable amount of prior art in the teaching of fluidizing lecithin. Fatty acids have been widely used as diluents. Braun et al., U.S. Patent 2,168,468, used mixed acids from castor oil and a small amount of polyethanolamines. When Wiesehahn, U.S. Patent 2,194,842, found that 5% soybean oil added to a mixture of 65% phosphatides and 35% oil had practically no effect on the consistency, he achieved softening by the inclusion of fatty acids. Wittcoff, U.S. Patent 2,843,748, employed an ester of a lower aliphatic monohydric alcohol and a higher fatty acid for controlling consistency. Markley, U.S. Patent 2,494,771, pointed out that the principal objections to the use of 65% AI (acetone insoluble content) lecithin are due to the high viscosity of the material and its pronounced tendency to settle and form layers upon standing, particularly during storage and especially during cool storage. For a 55–70% phosphatides range, Markley recommended the use of 1–15% of an aliphatic organic acid selected from the group consisting of oleic acid and sorbic acid and the balance an edible vegetable oil, which conposition remains homogeneous and relatively free-flowing over a wide temperature range to overcome the problem of plasticity.

In all these, the active ingredient phosphatides are substantially diluted with the fluidizing additive, in most, cases fatty acids or other organic acids, or both. Many uses for lecithin require the lowest possible acid value. High acid value is usually associated in the trade with fatty acids and thus with low oxidative and flavor stability of the product.

It is the object of this invention to provide a fluid soybean lecithin in a concentrated undiluted form, with a phosphatide content equivalent to plastic lecithin.

Another object is to provide a fluid lecithin without the use of fatty acids or other organic acids whereby desirably low acid values are achieved.

Still another object is to make a fluid commercial lecithin available that has more stable viscosities over a wider temperature range than products currently available in the trade.

I have discovered that when certain salts of divalent metal cations, such as calcium and magnesium chlorides, nitrates and acetates, are added to a lecithin emulsion (as obtained from the degumming of crude soybean oil) and upon drying the emulsion, a remarkably fluid product is obtained. This was achieved through adjusting the level of divalent cation to about 0.4% based on a 70% AI (acetone-insoluble matter, phosphatides) material. This fluidizing effect was apparent even at moisture levels higher than 0.4% and at acid values of less than 28. For lecithins having an AI content of less than 70%, correspondingly lower levels of divalent metal cations were sufficient to exert the fluidizing effect. Under the conditions mentioned, most lecithin products are plastic without the adjusment of the divalent metal cation content.

The acetone insolubles, referred to as AI in the examples, is determined by Method Ja 4–46 of the American Oil Chemists Society. Acid value, abbreviated as AV, is measured by a modification of Method Ja 6–55 of the American Oil Chemists Society, the modification being the use of an ethanol-benzene solvent system for dissolving the sample and alcoholic potassium hydroxide for titration.

Divalent metal ion (DVM) content is determined by the procedure for total calcium and magnesium as described by Martel and Calvin, Chemistry of the Metal Chelate Compounds, Prentice-Hall, Inc., 1952, pp. 482–490:

PROCEDURE (1) Warm the sample to soften the product (not over 60° C.) and then mix thoroughly.

(2) Weigh accurately 1.00 g. ($\pm 0.01$ g.) of sample into a 250 ml. Erlenmeyer flask. Add 50 ml. 30% aqueous ethyl alcohol (30 parts by volume 95% ethyl alcohol, 70 parts by volume distilled water) and an excess of 0.01 molar EDTA solution. (For normal samples of natural grade lecithin containing from about 0.15% to about 0.35% calcium, 10 ml. EDTA solution is satisfactory. For samples containing up to about 0.55% calcium, 15 ml. EDTA should be used.) Emulsify the sample by heating to about 70° C., preferably in a steam or water bath, and agitating. Cool to about 25° C. and rinse stopper and sides of flask with 50 ml. 30% aqueous ethanol.

(3) Add 10 ml. pH 10 buffer, and 3 to 5 drops of indicator. The color should be blue to green at this point. If pink to wine-red, too little EDTA has been added.

(4) While mixing on a magnetic mixer, titrate with 0.01 molar magnesium sulfate to a faint pink endpoint.

CALCULATIONS

The DVM content=

$$\frac{[(\text{ml. EDTA})(\text{molar}) - (\text{ml. MgSO}_4)(\text{mol})] 40.08 \times 100}{\text{sample wt. (grams)} \times 1000}$$

When the EDTA and magnesium sulfate are 0.01 molar and a 1.00 gram sample is used, the following simplified calculation may be used:

Percent DVM = (ml. EDTA − ml. $MgSO_4$) × 0.04

The results reported, therefore, include both calcium and magnesium. Furthermore, the reference to divalent metal ions describes metals of the alkaline earth group of the Periodic Table measured by this method, primarily Mg and Ca. It probably does not include barium, which may be present in trace quantities in lecithin.

In one commercial embodiment of the invention, calcium chloride was added to a lecithin emulsion, obtained from a regular plant degumming operation, in the following manner:

A 20% by weight calcium chloride solution was introduced into a sludge mixer containing 4200 lbs. lecithin, dry basis, in the form of an emulsion to increase the DVM content of the lecithin on a 70% AI basis to 0.57%. The original DVM content of the product was 0.24% on the 70% AI basis, and the actual AI content was 73%, both on a dry basis. After addition and mixing, drying was started using the conditions normally used for natural grade lecithins. As the material was fed to the drier, a lecithin emulsion transfer pump was started to convey additional emulsion from an emulsion holding tank into the sludge mixer to replace the material in the mixer at the same rate as it was fed into the drier. At this time, the addition of 20% calcium chloride solution was started on a continuous basis to insure a 0.57% level of DVM in the dried lecithin on a 70% AI basis. After the continuous drying operation (2400 lbs./hr. drying rate; emulsion temperature 135° F.; dried product temperature 220° F.; drier vacuum 29 inches Hg), the material was blended with degummed soybean oil to an AI level of 66.6%, at which point the DVM content was 0.53% by analysis. The viscosity of this product was found to be 18,500 cps. at 80° F. Production records indicated that lecithin made under similar plant conditions, but without the DVM addition, was plastic. It was necessary to add to such lecithin approximately 2–4% fatty acids to make a comparable fluid product.

A 4 oz. sample of this calcium chloride-treated lecithin was stored for a week at 34° F., along with two fatty acid-fluidized samples to demonstrate handling characteristics at refrigerated temperatures. At the end of the observation period, the calcium chloride-treated sample, while cold, poured from the jar, whereas the fatty acid-fluidized samples did not. This indicates that adjustment with certain salts of divalent metal ions results not only in a comparable fluid product with that obtained by dilution with fatty acids, but it also can result in a product with superior handling properties at low temperature storage conditions.

Among the other salts of divalent metal ions examined, calcium propionate, calcium lactate, calcium citrate and calcium gluconate gave less satisfactory results in fluidizing lecithin than the calcium and magnesium chlorides, nitrates and acetates. In the case of calcium citrate and calcium gluconate, part of the added salts precipitated from the lecithin, indicating that poor contact and reaction between the components was at least part of the reason for the lack of fluidizing activity. The addition of lactic, citric and gluconic acids to lecithin followed by a calculated quantity of calcium hydroxide, also was less satisfactory. Magnesium sulfate was also tried, but with no success.

Salts of divalent and trivalent cations outside the light metals of the alkaline earth group are useful in fluidizing plastic lecithin by minimizing the dilution attendant on the use of fatty acids. However, the acid value of the product may not remain at the usual low value (see Example 8 herein). Some of these cations, such as $Fe^{++}$ or $Fe^{+++}$, can be detrimental to the color and flavor stability of the product; others can precipitate out or disturb the clarity of lecithin.

Other objects and advantages will be apparent as illustrated by the following examples:

Example 1

This example illustrates the use of calcium chloride in batch preparation of fluid lecithin. Further, a comparison is given between calcium chloride-treated and fatty acid-treated fluidized lecithin.

As a control, a sample of natural grade plastic single-bleached lecithin 70% AI was diluted to 65.0% AI with degummed soybean oil and the moisture content adjusted to 0.7% (all moisture contents were determined by Karl Fischer analysis). The product became a firm plastic on standing overnight at about 25° C.

A series of four calcium chloride-containing samples was prepared by dissolving analytical reagent grade calcium chloride dihydrate in water, adding the aqueous solution to the lecithin (65% AI) at 70–80° C., and drying under vacuum to remove water. The calcium chloride additions were made to give 0.05, 0.10, 0.15 and 0.20% added calcium. The samples were analyzed for DVM content (expressed as $Ca^{++}$) using the procedure described earlier in this specification. The moisture content of all samples was adjusted to about 0.7%.

A fatty acid-containing series was prepared by diluting the control plastic lecithin with combinations of fatty acids and soybean oil to give 65% AI in each case. The fatty acids (distilled soybean) were added at the 0.7%, 1.4%, 2.1% and 2.8% levels. Moisture contents were adjusted to 0.7%.

Viscosity determinations were made using a Brookfield Synchro-Lectric viscometer, Model LVT, and are given in the following table:

EFFECT OF CALCIUM CHLORIDE AND FATTY ACIDS ON LECITHIN CONSISTENCY (LECITHIN AT 65% AI AND 0.7% MOISTURE)

| Additive | Percent DVM Calculated as $Ca^{++}$ | Storage Time (days) | Viscosity (cps.) [1] | Acid Value |
| --- | --- | --- | --- | --- |
| None | 0.29 | 1 | Plastic | 24.5 |
| 0.19% $CaCl_2 \cdot 2H_2O$ | 0.34 | 1 | Plastic | 24.5 |
| 0.38% $CaCl_2 \cdot 2H_2O$ | 0.39 | 128 | [2] 38,000 | 24.5 |
| 0.57% $CaCl_2 \cdot 2H_2O$ | 0.44 | 128 | 9,600 | 24.5 |
| 0.75% $CaCl_2 \cdot 2H_2O$ | 0.48 | 128 | 10,500 | 24.7 |
| 0.7% Fatty acid | 0.29 | 3 | Plastic | 25.2 |
| 1.4% Fatty acid | | 14 | Plastic | 26.4 |
| 2.1% Fatty acid | | 14 | 12,600 | 28.0 |
| 2.8% Fatty acid | | 14 | 14,000 | 29.3 |

[1] At 25° C.
[2] Thixotropic.

The data illustrate that 0.44 and 0.48% DVM content (as chloride) is satisfactory to fluidize this lot of natural grade lecithin. Fatty acid additions of 2.1 and 2.8% gave a fluid lecithin, but with a somewhat higher viscosity and a significantly higher acid value.

Example 2

This example illustrates that magnesium chloride may be used to fluidize lecithin. Magnesium chloride hexahydrate was dissolved in water and added to the lecithin of Example 1 in the same way as given in that example. The results obtained are as follows:

EFFECT OF MAGNESIUM CHLORIDE ON LECITHIN CONSISTENCY

| Additive | Percent DVM Calculated as $Ca^{++}$ | Storage Time (days) | Viscosity (cps.) [1] | Acid Value |
| --- | --- | --- | --- | --- |
| 0.25% $MgCl_2 \cdot 6H_2O$ | 0.32 | 2 | Plastic | 24.2 |
| 0.51% $MgCl_2 \cdot 6H_2O$ | 0.34 | 28 | Plastic | 24.9 |
| 0.76% $MgCl_2 \cdot 6H_2O$ | 0.41 | 13 | 11,000 | 25.8 |
| 1.67% $MgCl_2 \cdot 6H_2O$ | 0.46 | 53 | 12,000 | 27.9 |

[1] At 25° C.

The data show that magnesium chloride is equivalent to calcium chloride as a fluidizing agent for lecithin. The acid value increase resulting from magnesium chloride addition may be reduced by base addition without plasticizing the lecithin, e.g., by addition of about 0.2% sodium hydroxide.

*Example 3*

This example illustrates the fluidizing effect of calcium chloride on a different lot of commercial natural grade unbleached plastic lecithin (67.1% AI). Also illustrated is the possible disadvantage of excess addition. The products were prepared in the same manner as given in Example 1.

CALCIUM CHLORIDE ADDITION TO NATURAL GRADE UNBLEACHED PLASTIC LECITHIN (67.1% AI)

| Percent $CaCl_2 \cdot 2H_2O$ | Percent DVM Calculated as $Ca^{++}$ | Storage Time (days) | Viscosity (cps.)[1] | Acid Value |
|---|---|---|---|---|
| None | 0.20 | 1 | Plastic | 21.4 |
| 0.92 | 0.45 | 14 | 11,000 | 24.0 |
| 1.10 | 0.50 | 14 | 11,500 | 24.1 |
| 1.29 | 0.55 | [2] 4 | 14,000 | 24.3 |
| 1.47 | 0.60 | [2] 4 | 15,200 | 24.2 |

[1] At 25° C.
[2] Oil separation at 14 days storage.

At 0.45 and 0.50% DVM content, the products have desirable fluidity. At 0.55% DVM content, a small amount of oil separated within 14 days; larger amounts of oil separation occurred at 0.60% calcium. The moisture contents of these samples was 0.7%. At moisture contents of less than about 0.4%, oil separation has not been found.

*Example 4*

This example illustrates the fluidizing effect of calcium chloride on a commercial natural grade plastic unbleached lecithin (69.1% AI). The calcium chloride was added as in Example 1. Potassium hydroxide was added to adjust the pH of one sample to about the pH of the base lecithin.

ADDITION OF CALCIUM CHLORIDE TO NATURAL GRADE PLASTIC UNBLEACHED LECITHIN (69.1% AI)

| Additive | Percent DVM Calculated as $Ca^{++}$ | Storage Time (days) | Viscosity (cps.)[1] | Acid Value |
|---|---|---|---|---|
| None | 0.23 | 1 | Plastic | 21.7 |
| 0.92% $CaCl_2 \cdot 2H_2O$ | 0.45 | 8 | 32,500 | 24.3 |
| 1.10% $CaCl_2 \cdot 2H_2O$ | 0.51 | 8 | 33,500 | 23.2 |
| 1.29% $CaCl_2 \cdot 2H_2O$ | 0.55 | 8 | 46,000 | 24.8 |
| 1.47% $CaCl_2 \cdot 2H_2O$ | 0.58 | 8 | 46,000 | 23.9 |
| 1.10% $CaCl_2 \cdot 2H_2O$ +0.29% KOH | 0.48 | 3 | 39,000 | 22.1 |

[1] At 25° C.

The optimum low viscosity is obtained at 0.45 and 0.51% DVM content. The addition of 0.29% potassium hydroxide to give a pH equivalent to the initial pH (7.30) lowered the acid value about to that of the original lecithin with a relatively minor increase in viscosity. This example also illustrates the fluidizing effect on high AI content lecithin. Three to four percent fatty acids are required to fluidize this lecithin. However, such amount of acid gives an undesirable increase in acid values (about 7 to 8 units) and decreases in AI (2.1% and 2.8%).

*Example 5*

This example compares calcium chloride, calcium acetate and fatty acid treatment of a plastic natural grade lecithin.

The plastic natural grade lecithin starting material analyzed as follows:

| | | |
|---|---|---|
| Acetone insoluble | percent | 67.8 |
| Moisture (Karl Fischer) | do | 1.10 |
| Oil | do | 31.1 |
| Acid value | | 23.4 |
| pH (1% aqueous dispersion) | | 7.5 |
| Percent DVM calculated as $Ca^{++}$ | percent | 0.34 |

The samples were prepared by adding to the lecithin either an aqueous solution or an aqueous slurry of the calcium salt. This mixture was then heated to about 60° C. to melt the lecithin, and the mass mixed for 15 minutes. The samples were then dried under vacuum, with heat, in the usual manner.

The drying process results in lecithin moistures of about 0.2% (by Karl Fischer method). So at this point another 0.5% moisture was added as distilled water to bring the level of moisture up to 0.7%. This represents the level of moisture at which a lecithin is most likely to plasticize. Thus, if a sample remains fluid, it has done so under adverse conditions.

All samples were diluted with degummed soybean oil to an AI level of 65% before measuring their viscosities. Results are shown in a tabular form:

| Treatment | Percent DVM Calculated as $Ca^{++}$ | Acid Value | Viscosity (cps.) at 78° F. |
|---|---|---|---|
| Control | 0.32 | 23.4 | Plastic. |
| Calcium Chloride | 0.41 | 24.6 | 12,200 [1] after 83 days. |
| Do | 0.46 | 24.4 | 11,100 [1] after 83 days. |
| Calcium Acetate | 0.39 | 23.1 | Plastic after 83 days. |
| Do | 0.55 | 22.4 | 10,550 [1] after 60 days. |
| Fatty Acids (1.62%) | | 26.8 | 10,400 [1] after 76 days. |
| Fatty Acids (2.36%) | | 28.3 | 9,100 [1] after 76 days. |

[1] Indicated viscosity in cps. obtained using the Brookfield Helipath device.

*Example 6*

This example shows the treatment of two different batches of natural grade lecithins with calcium chloride or fatty acids to illustrate the general validity of the fluidizing effect of divalent metal ions on all types of natural grade soybean lecithin. The method of preparation followed that in Example 5.

EFFECT OF CALCIUM CHLORIDE ON VISCOSITY OF NATURAL GRADE PLASTIC UNBLEACHED LECITHIN (67.09% AI)

| Sample No. | Percent DVM Calculated as $Ca^{++}$ | Acid Value | Viscosity (cps.) at 78° C. | | | |
|---|---|---|---|---|---|---|
| | | | 4 days | 18 days | 18 days | 81 days |
| 1 | 0.24 | 21.4 | Plastic | | | |
| 2 | 0.46 | 24.0 | 11,000 | 11,000 | [3] 13,900 | Fluid. |
| 3 | 0.51 | 24.1 | 12,000 | 11,500 | [3] 13,600 | Do. |
| 4 | 0.54 | 24.3 | 13,850 | [2] 5,250 | [3] 17,600 | Oil sep. |
| 5 | 0.60 | 24.2 | 15,200 | [2] 3,500 | [3] 34,300 | Do. |

[1] Control.
[2] Oil sep.
[3] Indicates viscosity in cps. obtained using the Brookfield Helipath device (remixed by hand prior to determining viscosity).

Fatty acid controls were obtained by diluting the 67.09% AI natural grade plastic unbleached lecithin to 63.5% AI with fatty acids and soybean oil.

The following results were obtained:

|  | G. Diluent Added to 500 g. Lecithin | | Acid Value | Viscosity (cps.) at 78° C. | | | |
|---|---|---|---|---|---|---|---|
|  | Fatty Acids | DGSBO [1] | | 3 days | 11 days | 15 days | 78 days |
| 6 | 17.6 | 10.6 | 27.1 | 6,360 | 14,200 | [2] 30,900 | Plastic. |
| 7 | 21.2 | 7.1 | 27.5 | 6,800 | 6,150 | [2] 12,300 | Fluid. |
| 8 | 24.7 | 3.5 | 30.7 | 7,520 | 7,400 | [2] 8,100 | Do. |
| 9 | 28.2 | 0 | 31.1 | 8,040 | 7,750 | [2] 8,700 | Do. |

[1] Degummed soybean oil.
[2] Indicates viscosity in cps. obtained using the Brookfield Helipath device (remixed by hand prior to determining viscosity).

EFFECT OF CALCIUM CHLORIDE ON VISCOSITY OF NATURAL GRADE PLASTIC UNBLEACHED LECITHIN (69.1% AI)

| Sample No. | Percent DVM calculated Ca++ | Acid Value | Viscosity (cps.) at 78° C. | | |
|---|---|---|---|---|---|
|  |  |  | 8 days | 12 days | 45 days |
| 1 | [1] 0.23 | 23.0 | Plastic |  | Fluid. |
| 2 | 0.45 | 24.3 | 32,350 | [2] 48,200 | Do. |
| 3 | 0.51 | 25.1 | 33,400 | [2] 60,800 | Do. |
| 4 | 0.52 | 24.8 | 48,800 | [2] 64,300 | Do. |
| 5 | 0.58 | 23.9 | 46,450 |  | Do. |

[1] Control.
[2] Indicates viscosity in cps. obtained using the Brookfield Helipath device (remixed by hand prior to determining viscosity).

the product (acetone insolubles, AI) or appreciably increasing the acid value (AV).

On a 70% AI basis, the optimum calcium content (divalent metal ion) is 0.45 to 0.50%. Separation of components occurred at 0.55 and 0.60% calcium in one series at 0.7% moisture.

Example 7

This example illustrates that even slight increases in acid value (AV) and changes in pH, as a result of divalent metal ion treatment, can be corrected by neutralizing the treated product. Such a neutralization will have no significant effect on the viscosity or on the phosphatide content (acetone insolubles, AI) of the finished product.

A natural grade, plastic, unbleached lecithin having an AI content of 69.1% and an acid value (AV) of 23.0, was used as starting material. To this sample calcium chloride was added to adjust its DVM content to 0.5%; neutralization with potassium hydroxide then followed,

| No. | Composition | Percent DVM calculated as Ca++ | pH, 1% aqueous dispersion | Acid Value | Viscosity (cps.) at 78° F.[1] |
|---|---|---|---|---|---|
| 1 | Lecithin (untreated) | 0.23 | 7.20 | 23.0 | [2] Plastic (97) |
| 2 | Ca-fluidized Lecithin | 0.50 | 6.50 | 25.1 | [2] 35,153 (97) |
| 3 | No. 2 Neutralized with KOH (0.48 g./500 g.) | 0.49 | 6.72 | 22.6 | [2] 41,234 (92) |
| 4 | No. 2 Neutralized with KOH (1.45 g./500 g.) | 0.48 | 7.15 | 22.1 | [2] 40,234 (91) |

[1] Indicates viscosity in cps. obtained using the Brookfield Helipath device (remixed by hand prior to determining viscosity).
[2] Numbers in parentheses indicate days elapsed after preparation.

Fatty acid controls were obtained by diluting the 69.1% AI natural grade plastic unbleached lecithin to 65.4% AI with fatty acids and soybean oil.

The following results were obtained:

|  | G. Diluent Added to 500 g. lecithin | | Acid Value | Viscosity (cps.) at 78° C. | |
|---|---|---|---|---|---|
|  | Fatty Acids | DGSBO [1] | | 6 days | 39 days |
| 6 | 17.6 | 10.6 | 27.3 | [2] 202,500 | Plastic. |
| 7 | 21.2 | 7.0 | 28.9 | [2] 26,800 | Fluid. |
| 8 | 24.7 | 3.5 | 30.1 | [2] 26,400 | Do. |
| 9 | 28.2 | 0 | 30.1 | [2] 31,200 | Do. |

[1] Degummed soybean oil.
[2] Indicates viscosity in cps. obtained using the Brookfield Helipath device (remixed by hand prior to determining viscosity).

These results demonstrate again that calcium chloride can replace fatty acids as a fluidizing agent for lecithin without appreciably reducing the phosphatide content of with subsequent drying to obtain a final moisture content 0.7%. The results are given above in tabular form.

The above results show that there is a slight increase in viscosity when calcium fluidized lecithin samples are neutralized with potassium hydroxide, but this slight increase has no practical consequences in that the material is readily pourable. It can also be noted that considerably less alkali is needed to restore the acid value of the calcium fluidized sample to that of the starting material than to restore the pH.

Example 8

This example shows the effect of the trivalent aluminum ion on lecithin consistency.

To 500 g. portions of natural grade plastic unbleached lecithin aqueous solutions of aluminum chloride hexahydrate were added. The lecithin was melted at about 60° C. and the mass mixed for 15 minutes, after which it was dried under vacuum to 85° C. The moisture level was then adjusted to 0.7%. The aluminum ion levels tested were as follows:

| Percent Al ion added | pH (1% aqueous) dispersion | Acid Value | Viscosity (cps.) at 78° F.[1] |
|---|---|---|---|
| 0.00 | 7.20 | 23.0 | Plastic (7).[2] |
| 0.05 | 5.35 | 24.9 | Do.[2] |
| 0.10 | 4.12 | 27.2 | Do.[2] |
| 0.15 | 3.70 | 30.4 | 31,900 (7), fluid (42).[2] |
| 0.20 | 3.50 | 34.4 | 35,500 (7), fluid (42).[2] |

[1] Indicates viscosity in cps. obtained using the Brookfield Helipath device (remixed by hand prior to determining viscosity).
[2] Numbers in parentheses indicate days after preparation.

From the data it is seen that aluminum chloride fluidizes natural plastic lecithin very effectively. However, the aluminum chloride has a much greater effect on the acid value of the lecithin than does the calcium chloride. At the 0.20% level of aluminum ion, the pH is very low and the acid values are increased considerably.

Neutralization of the above described samples with potassium and sodium hydroxides was tried; however, this made the samples become plastic again.

*Example 9*

This example shows the fluidizing effect of calcium nitrate. To 300 g. of natural grade plastic single bleach lecithin at 70° C. was added 5.05 g. of calcium nitrate tetrahydrate dissolved in 10 ml. of distilled water. After mixing and vacuum drying, the moisture content was adjusted to 0.7%. The DVM content was increased to 0.57% by this addition (original DVM=0.30%; AI=66.5%). The viscosity was 11,800 cps. at 79° F. after 30 days. The original starting material had an acid value of 25.1 and the calcium nitrate treated material had one of 27.2.

*Example 10*

This example shows the effectiveness of calcium chloride on lecithin plasticity when added to the degumming water.

*Degumming with water alone.*—112.5 ml. of distilled water was added to 4500 g. non-degummed soybean oil at 80° C. and heated to 90° C. while agitating. The emulsion was held a total of 20 minutes at 80–90° C., centrifuged and vacuum dried. 3.11% lecithin at 65.5% AI was obtained. The product was a firm plastic and had a DVM content of 0.25%.

*Degumming with 1.2% calcium chloride solution.*—112.5 ml. of water containing 1.20 g. of calcium chloride was added and processed as above. 3.18% lecithin at 62.0% AI was obtained. The DVM content of this treated product was 0.54% with a viscosity of 5,400 cps. at 79° F.

*Example 11*

This example illustrates hydrochloric acid treatment followed by neutralization with magnesium hydroxide:

To 300 g. natural grade single bleach plastic lecithin (AI=66.5%, DVM=0.30%) was added 3.6 ml. of 37% hydrochloric acid at 70° C. and 1.18 g. of magnesium hydroxide in 15 ml. of distilled water. After mixing for 30 minutes at 70–75° C., the lecithin was vacuum dried and the moisture content adjusted to about 0.7%. The viscosity was 13,000 cps. at 79° F. The acid value of the starting material was 25.1 and it was 27.9 for the treated lecithin (the pH was 7.1 and 6.10, respectively).

*Example 12*

This example illustrates acetic acid treatment followed by neutralization with calcium hydroxide:

To 300 g. natural grade single bleached plastic lecithin (AI=66.5%, DVM=0.30%) was added 2.40 ml. of glacial acetic acid and 1.50 g. calcium hydroxide in 15 ml. distilled water at 70° C. After mixing for 10 minutes at 70° C., the added water was removed under reduced pressure and the moisture content adjusted to 0.68%. After two days, the viscosity was 62,000 cps. at 78° F. (thixotropic). The acid values for the starting material and treated lecithin were 25.1 and 24.3, respectively. (The corresponding pH values were 7.1 and 6.55.)

*Example 13*

This example illustrates the treatment of a very high AI content lecithin with calcium chloride:

A natural grade plastic unbleached lecithin at 74.1% AI and 0.27% DVM was treated with 40% calcium chloride solution to adjust the DVM content to 0.40 and 0.52% in 0.02% increments. The moisture content was adjusted in all samples to 0.65%. Viscosity measurements after 40 days at 80° F. were as follows:

| Percent DVM calculated as $Ca^{++}$ | Viscosity (cps. at 80° F.) |
|---|---|
| 0.27 | Plastic |
| 0.40 | Plastic |
| 0.42 | 254,000 (thix.) |
| 0.44 | 196,000 |
| 0.46 | 182,000 |
| 0.48 | 182,000 |
| 0.50 | 202,000 |
| 0.52 | 204,000 |

The results show that at DVM contents between 0.42 and 0.44% for high AI contents lecithin, fluidization may not be satisfactory completely. The optimum is from 0.46 to 0.48% on this sample of natural grade lecithin. On a 70% AI basis, the minimal DVM content for high AI lecithin is from 0.435 to 0.455%.

SUMMARY

In summary, the following may be derived from the foregoing examples:

(1) Adjustment of the DVM content of natural grade plastic lecithin to above about 0.4%, on a 70% AI basis, with calcium and magnesium chloride, nitrate or acetate, results in a fluid product with an acid value of less than 28. The fluidity was consistent even at moisture levels of 0.4% or higher. An effective upper limit of moisture is of the order of 1.5%.

(2) To achieve the results corresponding to those mentioned under (1), it was necessary to use over 2.0% fatty acids as diluents whereby the material, in addition to being diluted, had acid values higher than 28. Furthermore, the viscosities of the fatty acid-treated samples, within the commercially practical range, were also relatively higher than those obtained for the claimed range for the calcium and magnesium salts described in this invention.

(3) At a DVM content above about 0.5% (on a 70% AI basis), the optimum fluidizing point has been exceeded and, occasionally, oil separation may be observed. However, fluidity is achieved even with DVM contents of the order of 0.6%.

(4) In cases where there is a slight increase in acid value as a result of treatment, neutralization with a base such as sodium or potassium hydroxide is feasible for restoring the pH and acid value of the starting material without impairing the fluidized effect.

(5) The fluidizing influence of calcium and magnesium salts claimed in this invention is effective in the dried lecithin product, in the lecithin emulson, and when added to the degumming water prior to mixing it with the crude oil.

(6) Trivalent metal ions, such as aluminum, have also a fluidizing effect; however, they tend to increase the acid value, and when the treatment is followed by neutralization, the material becomes plastic.

(7) The addition of hydrochloric, nitric and acetic acids, followed by a calculated amount of calcium or magnesium hydroxide, at the DVM levels mentioned, was effective. This was not true for propionic, lactic, citric and gluconic acids. As mentioned in the previous discussion, magnesium sulfate and barium chloride were also ineffective.

(8) The DVM adjusted lecithin samples also showed better handling properties at low temperature when compared with the fatty acid diluted products.

While in the foregoing specification I have set forth a detailed description of the invention for the purpose of explanation thereof, many variations in the details herein given may be made by those skilled in the art without departing from the spirit and scope of the invention.

I claim:

1. In a method of lecithin fluidization, the step of adding to said lecithin a cation selected from the group consisting of calcium, magnesium and aluminum and an anion selected from the group consisting of chloride, acetate and nitrate in a quantity sufficient to provide a cation concentration of the order of about 0.4–0.6% of the lecithin, considered as divalent metal based upon lecithin as having 70% acetone insoluble matter and then drying the resulting mixture.

2. The method of claim 1 in which said cation and said anion are added in the form of a salt.

3. The method of claim 1 in which said cation and said anion are added in the form of an acid and a base.

4. The method of claim 1 in which said cation and anion are added in the form of an aqueous solution to form an emulsion with said lecithin, said emulsion being dried to provide a water content in said lecithin below about 1.5%.

5. The method of claim 1 in which said lecithin is in a non-degummed soybean oil.

6. A fluidized lecithin product, comprising a lecithin having a moisture content below about 1.5% and including a cation selected from the group consisting of calcium, magnesium and aluminum, and an anion selected from the group consisting of chloride, acetate and nitrate in a quantity sufficient to provide a cation concentration of the order of about 0.4–0.6% of the lecithin, considered as divalent metal based upon lecithin calculated as having 70% acetone insoluble matter.

References Cited

UNITED STATES PATENTS

| 2,555,137 | 5/1951 | Karjala | 252—1 |
| 2,943,051 | 6/1960 | Lummus | 252—8.5 |

LEON D. ROSDOL, *Primary Examiner.*

J. T. FEDIGAN, IRWIN GLUCK, *Assistant Examiners.*